April 29, 1941.  H. E. MARTIN  2,239,753
PRECIPITATION OF CELLULOSE COMPOUNDS
Filed May 13, 1938  2 Sheets-Sheet 1
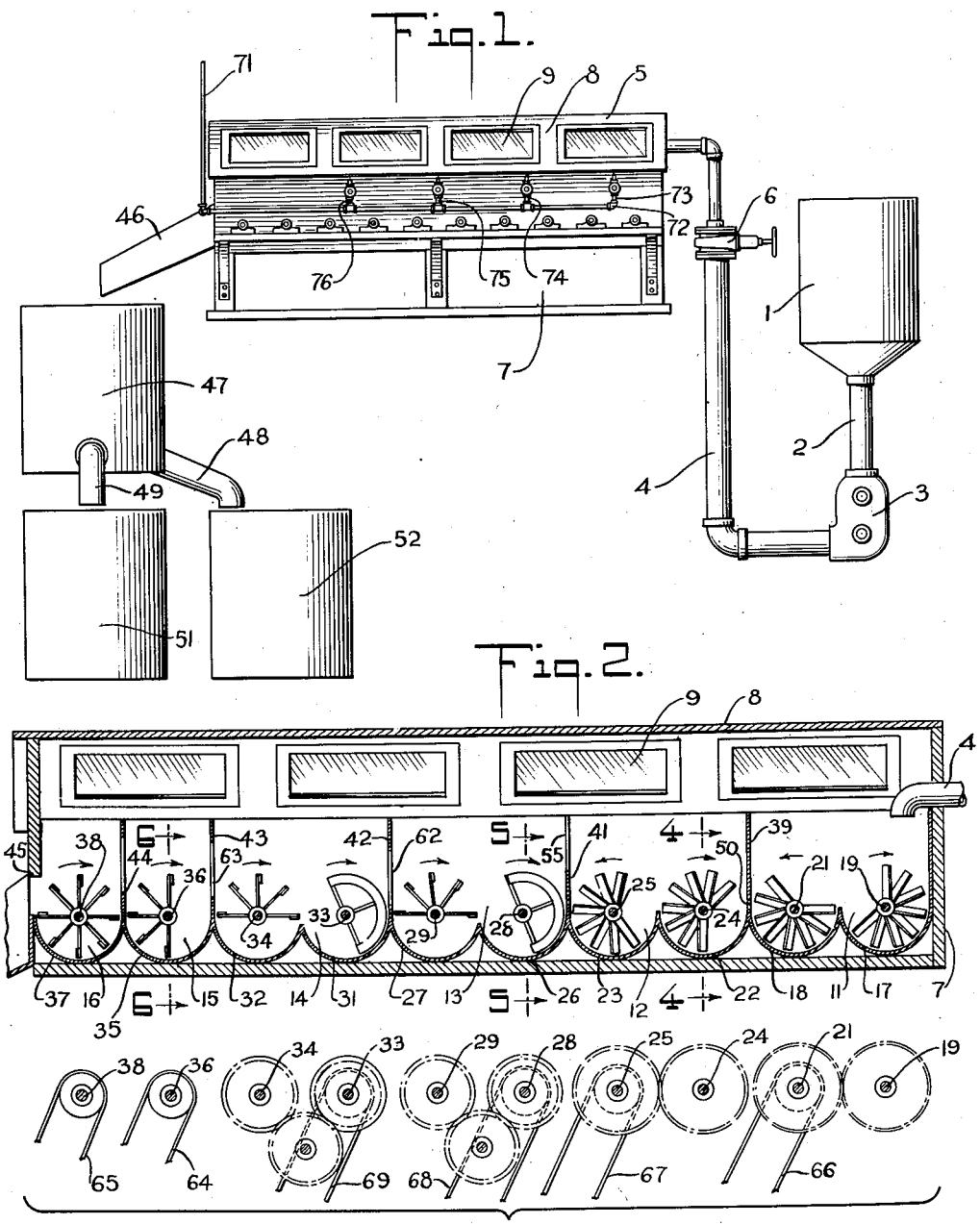
INVENTOR
Herbert E. Martin.
BY
ATTORNEY

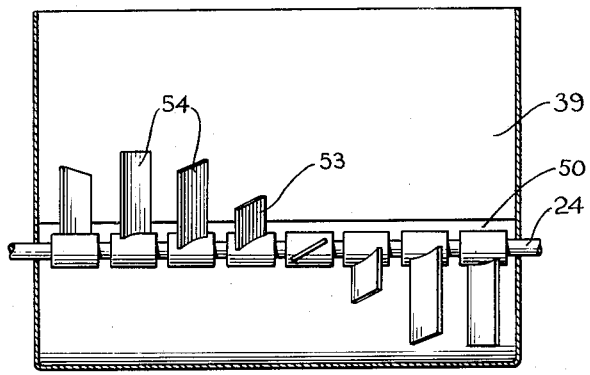
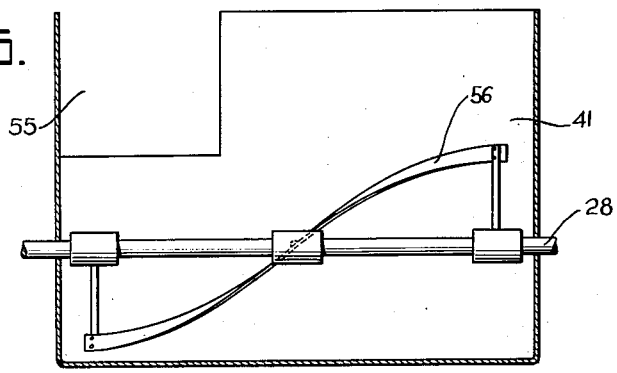
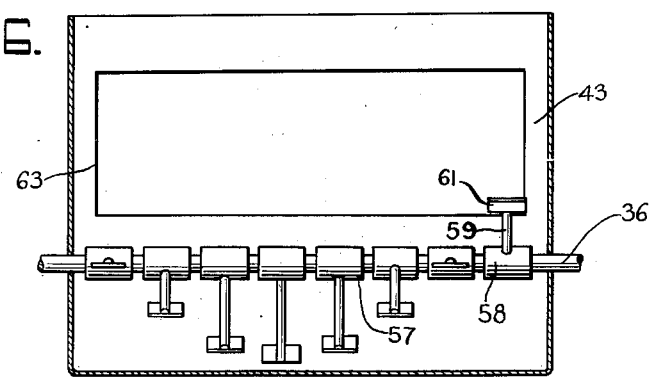

Patented Apr. 29, 1941

2,239,753

UNITED STATES PATENT OFFICE 2,239,753

PRECIPITATION OF CELLULOSE COMPOUNDS

Herbert E. Martin, Cumberland, Md., assignor to Celanese Corporation of America, a corporation of Delaware Application May 13, 1938, Serial No. 207,696

2 Claims. (Cl. 260—230)

This invention relates to the production of organic derivatives of cellulose, and more particularly to a method and device for precipitating organic esters of cellulose from a solution in which they are formed.

An object of this invention is to provide an improved method and apparatus for precipitating organic esters of cellulose in a continuous manner and under conditions which may be so controlled as to produce any desired type of fiber.

Another object of the invention is the prevention of the escape of acid fumes into the work rooms, which acid fumes cause discomfort and inconvenience to employees and great corrosive damage to buildings and machinery.

A further object of the invention is the provision of a method of precipitating organic esters of cellulose from acid solutions wherein a uniform and continuous feed of precipitated material is delivered to the washers and driers and a uniform strength of acid is delivered to the acid recovery system. Other objects of this invention will appear from the following detailed description and drawings.

In the drawings, wherein like reference numerals refer to the same or similar elements in the several views:

Fig. 1 is a side view of a continuous precipitator constructed in accordance with this invention, Fig. 2 is a sectional view of the precipitator, Fig. 3 is a diagrammatic view showing the driving elements of the precipitator, Fig. 4 is a sectional view, taken on line 4—4, of Fig. 2, Fig. 5 is a sectional view, taken on line 5—5, of Fig. 2 and Fig. 6 is a sectional view, taken on line 6—6, of Fig. 2.

In the production of organic derivatives of cellulose, and especially organic esters of cellulose, the solution in which the derivative of cellulose is produced contains a catalyst and side products of the reaction. The esterification of cellulose with an organic acid results in a solution of the derivative of cellulose in an acid solvent. These derivatives of cellulose are precipitated by adding water until the concentration of the acid reaches a point below which the acid will not hold the derivative of cellulose in solution. The addition of water to the solution at a fast rate would result in a hard gel which is almost impossible to redissolve. Therefore, it is customary to feed in the water slowly and precipitate gradually thus producing a fibrous or crumb-like precipitate. Commercially this precipitation step has been carried out by batch processes in huge bowls equipped with power driven beaters. I have found that the derivative of cellulose may be precipitated on a commercial scale in a continuous precipitator and that the physical structure of the precipitate may be controlled.

In accordance with my invention, I construct a device for continuously precipitating derivatives of cellulose in which the derivative of cellulose, continuously fed thereto, passes through a plurality of zones where a precipitating liquid is added and thoroughly mixed with the derivative of cellulose and solvent. By controlling the type and amount of precipitating liquid and the speed of the material through the various zones, there are produced precipitates having any desired physical form from fine fibers, coarse fibers and crumbs to gelled lumps.

This invention is applicable to the production of organic derivatives of cellulose such as the organic esters of cellulose and the cellulose ethers. Examples of the organic esters of cellulose are cellulose acetate, cellulose formate, cellulose propionate and cellulose butyrate, while examples of the ethers of cellulose are ethyl cellulose, methyl cellulose and benzyl cellulose. Although the invention is applicable to the production of any organic derivative of cellulose, it will be described with reference to the production of the commercially most important organic derivative of cellulose, namely cellulose acetate.

While, in accordance with this invention, the cellulose acetate or other organic ester of cellulose may be precipitated from any solution such as, for instance, solutions formed by dissolving the prepared cellulose acetate in suitable solvents, it is particularly important in connection with the precipitation of cellulose acetate or other organic esters of cellulose from esterifying mixtures, that is to say from solutions formed by the esterification of cellulose by means of formic acid or the anhydride or chloride of acetic acid, propionic acid, butyric acid and the like in the presence of a catalyst such as sulphuric acid, phosphoric acid or other acid catalysts, and also in the presence of a sufficient amount of solvent such as acetic acid, propionic acid, butyric acid, etc. to cause the resulting cellulose ester to dissolve to form a heavy viscous solution of the consistency of molasses.

In making cellulose acetate by the so-called solution method, cellulose is acetylated by means of acetic anhydride and a catalyst in the presence of a relatively large amount of acetic acid which dissolves the cellulose acetate that is formed to produce a very heavy viscous solution. This solution, usually after hydrolysis or ripening to develop the desired solubility characteristics, is then precipitated by the addition of a precipitating liquid, such as water, which dilutes the acetic acid to such an extent that it is no longer capable of holding the cellulose acetate in solution. However, since the solution of cellulose acetate is very viscous the precipitating liquid draws the solvent from the cellulose acetate such that it forms a gel if no stirring accompanies the addition of the precipitating liquid. If the precipitating liquid is beaten into the batch the precipitating liquid acts on the particles or streams of the cellulose acetate to precipitate the same in shreds with sort of a case hardening effect with the result that the acid used as catalyst or as reagent becomes trapped within the particles and cannot be thoroughly removed by washing. However, if more vigorous stirring and beating is employed and the precipitant is diluted with solvent for the cellulose acetate, the cellulose acetate is precipitated in the form of finer and softer fibers which may readily be stabilized by washing and quickly redissolved.

By employing the method and apparatus of this invention cellulose acetate may be precipitated in such a manner as to obtain any desired type of precipitation. For instance, there may be obtained large fibers which are not completely hardened and which may be hardened by passing them into a more concentrated bath of precipitant such as water employed in washing the fibers. Although this type of filter is sometimes desired, it is rather difficult to dissolve in acetone and similar solvents employed in the production of artificial silk from the cellulose acetate. However, by treating the cellulose acetate in several stages or zones and controlling the time that the cellulose acetate remains in each of the various zones and the concentration of the precipitating liquid added thereto in each zone fibers of smaller size may be produced. The fiber produced is not only more uniform than that obtained by the use of the batch process and the fiber produced may be, as pointed out above, completely hardened when discharged from the precipitator of applicant's invention. The finer fibers formed by the addition of weaker precipitating solutions, especially in the first three zones, are more easily stabilized and freed of any acid which is entrapped therein.

For a more complete understanding of the invention, the same will be described with reference to the accompanying drawings wherein the preferred embodiment of my invention is shown. A receptacle 1 is provided for receiving the solution of cellulose acetate from an esterifying process or other process wherein the derivative of cellulose is in solution. The receptacle 1 is connected through a feed line 2 to a pump 3 which may be of any suitable type, but is preferably of the double worm gear type. A feed line 4 connects the pump 3 to the continuous precipitator generally indicated by reference numeral 5. A valve 6 may be interposed in the line 4 for controlling the feed rate of the solution to the precipitator.

The precipitator is formed of a rectangular housing 7 having a roof 8 and is preferably provided with windows 9 therein such that the operations within the precipitator may be watched. The precipitator 5 is divided into a plurality of zones 11, 12, 13, 14, 15 and 16. In the zone 11 is mounted two troughs 17 and 18 each containing a shaft 19 and 21. Similarly zone 12 is divided into two troughs 22 and 23 each containing a shaft 24 and 25. Zone 13 is also divided into two troughs 26 and 27 each containing a shaft 28 and 29. Similarly zone 14 is divided into two troughs 31 and 32 each containing two shafts 33 and 34. Zone 15 consists of a single trough 35 containing a shaft 36, while zone 16 consists of a single trough 37 containing a shaft 38. Between the various zones are partitions such as those indicated by the reference numerals 39, 41, 42, 43 and 44.

In operation the solution of cellulose acetate to be precipitated enters the precipitator 5 through feed line 4 to the first trough 17 of the first zone 11 and is carried from there through the various troughs and zones until it is ejected from the precipitator through the opening 45 into a sluiceway 46. The precipitated material along with the diluted acid is discharged from the sluiceway 46 into a settling tank 47 wherein the dilute acid is withdrawn and the precipitated cellulose acetate is deposited through conduits 48 and 49 into stabilizing vats or washers 51 and 52.

The advantage of dividing the precipitator into zones and troughs is that individual stirrers may be provided having individual speeds which may be varied from one section to the other depending upon the time necessary to hold the solution or fibers in each section. Furthermore, one stirrer may be stopped for cleaning or repairing without stopping the others.

Upon each shaft operating in the various troughs are mounted stirrers. These stirrers are different in design according to the special function in the process. For instance, the shafts 19 and 21 in the zone 11 and shafts 24 and 25 in zone 12 have mounted thereon a stirrer 53 as shown more in detail in Fig. 4. This stirrer consists of blades set on the shaft at about a 30° angle and staggered around the shaft so as to give a screw effect. The blades 54 are set in a spiral so as to carry the solution back and forth across the precipitator thus giving more uniform mixing of the solution and the dilute precipitating acid which is added at that zone. The stirrers in zones 11 and 12 turn toward each other so as to pull the viscous solution towards the center of the two stirrers. As the solution of the derivative of cellulose becomes sufficiently worked with the dilute liquid it passes through a narrow slot 50 in the partition 39. After the solution of cellulose acetate has been further diluted or thinned and uniformly mixed with the precipitating liquid in zone 12, it is forced to rise over the partition 41 through an opening 55 in one end thereof.

The solution of the derivative of cellulose is held in zones 11 and 12 and has added thereto sufficient precipitating liquid to thin down the solution in which condition it is passed through the cutaway portion 55 into zone 13. In the zone 13 sufficient precipitating liquid is added to commence the precipitation of the derivative of cellulose. In this zone the shaft 28 operating in the first trough 26 is provided with a spiral screw-like stirrer 56, such as is shown on a larger scale in Fig. 5, while the second trough of this zone is equipped with a beater-stirrer 57. The stirrer 56 may be a strip of stainless steel or other metal twisted into a spiral. Due to the radius of troughs 26 and 27 overlapping one another the precipitated derivative of cellulose is pulled or stretched at the same time that it is being well mixed with the precipitating liquid. The beater-stirrer 57 is formed by threading a plurality of hubs 58 on the shaft, each hub containing an extending shaft 59 at the end of which is mounted a paddle 61. These paddles act to grab the precipitated derivative of cellulose from the stirrer 56 and pull it out or stretch it such that the tendency is to form a fibrous precipitate. The material is discharged from zone 13 through an opening 62 in the partition 42 to zone 14 containing an identical set of stirrers and beaters as in zone 13. In zone 14 additional precipitating liquid is added while the material is pulled and stirred until a definite fibrous precipitate is formed. The opening 63 in the partition 43 is slightly higher than the opening 62 in the partition 42 thus retaining the precipitated fibers slightly longer in that zone. The precipitated fibers along with the mother liquor and precipitating liquid is discharged into zone 15 where the stirrers similar to those shown in Fig. 6 beat the material and tend to harden the fibers, finally discharging them into zone 16 where a similar action takes place. The length of time the fibers are held in zones 15 and 16 will regulate to a substantial extent the hardness of the fibers precipitated from the machine. For this reason each of the shafts 36 and 38 in these zones is provided with an individual drive 64 and 65. As shown in Fig. 3 each zone of the other zones is also provided with an individual drive 66, 67, 68 and 69. However, one or more of these zones may be geared together and driven from a single source of power in timed relation to each other. It is obvious, however, that a greater latitude of adjustment may be made if each zone in the machine is separately driven.

The precipitating liquid may be introduced into the various zones by means of a feed line 71 which has a header 72 running along the side of the machine with branch lines 73, 74, 75 and 76 entering into zones 11, 12, 13 and 14, respectively. It may be desired in certain cases to have each of the feed lines 73, 74, 75 and 76 connected to a separate source of supply such that the concentration of the precipitating liquid may be varied in each compartment. These feed-in lines are controlled by suitable valves.

As an illustration of the operation of the device, cellulose acetate dissolved in substantially glacial acetic acid coming from an acetylizer is pumped into zone 11 and thinned with a 30% solution of acetic acid in water. The thin solution passes under partition 39 through slot 50 into zone 12 where it is further thinned with a 20% solution of acetic acid in water. This solution then passes over the cut-away portion 55 in partition 41 into zone 13 where it is precipitated by the addition of a 10% solution of acetic acid in water. The precipitated fiber then passes into zones 14, 15, and 16 where it is hardened with the further addition of 10% solution of acetic acid in water and finally discharged from the sluiceway 46 as a fiber suspended in a 40% acetic acid solution. By controlling the amount of cellulose acetate solution pumped to the device and the quantities and concentration of precipitating liquid added a uniform concentration of acid is obtained from the sluiceway 46 which greatly facilitates the recovery of the acetic acid. This is distinguished from the prior batch processes wherein the first acid was relatively strong while the last of the acid had a concentration of about 10% which had to be stored and blended in large storage tanks prior to entering the recovery system, whereas in the present invention the acid may be drawn from the precipitated cellulose acetate and run directly to the recovery system.

In the above example the fact that 30% dilute acetic acid was used for thinning the solution in the first zone prevents the bringing of the solution of cellulose acetate to the precipitating point in zone 12 so that upon passing into zone 13 the cellulose acetate is precipitated in a fairly coarse fiber. A finer fiber and one which is completely hardened at discharge from the precipitator may be obtained by thinning the solution in zones 11 and 12 with a 10% solution of acetic acid and adding a 10% solution acetic acid to zones 13, 14 and 15. By this method cellulose acetate is precipitated readily upon passing into zone 13 and it is completely hardened before passing out of the device. Obviously other concentrations of acid or other solvents and precipitants may be employed. It is preferable, however, to employ water as the precipitant and a similar solvent to that employed in the original solution of the derivative of cellulose as this greatly facilitates recovery of the solvent and makes an economy in the process. For instance, cellulose acetate may be precipitated from its solution in acetone by adding in the various zones a solution of acetone and water. It is not necessary that the precipitating liquid be a true solution for mixtures of solvent and precipitant also may be employed. In a similar manner also kali-soluble cellulose ethers may be precipitated from this solution in alkali by the addition of dilute aqueous alkali solutions in the various zones, which precipitating liquid may be considered a solution of solvent (concentrated alkali) in a precipitating liquid (water).

If desired, sodium carbonate or other such chemical reagent may be introduced into either zone 11 or 12 to substantially neutralize the inorganic acid catalyst, if any was used, and also to produce a gas. This latter step tends to make a more voluminous precipitate. It will be seen from the above description that a uniform type of fiber may be obtained and a constant strength of the weak acetic acid maintained. It is possible to keep the precipitator entirely closed thus eliminating fumes escaping into the plant. To a large degree the size of fiber depends upon the rate of throughput and the concentration or the amount of precipitant added in thinning the solution of the derivative of cellulose before precipitation. The greater the throughput the larger the fiber or if the throughput is too fast a lump is produced. The precipitator being continuous may be hooked directly to a rotary washer as the feeder therefor thus eliminating the feeder compartment now necessary in rotary washers. The uniform type of fiber obtained give better stabilizing and washing during the processing of the cellulose acetate.

It is to be understood that the foregoing detailed description is merely given by way of illustration and that many variations may be made therein without departing from the spirit of my invention.

Having described my invention, what I desire to secure by Letters Patent is:

1. Process for recovering a stable derivative of cellulose, selected from the group consisting of cellulose esters of lower aliphatic acids and cellulose ethers, from solution which comprises bringing the solution gradually to the point at which the cellulose derivative is precipitated, by three successive additions of mixtures of a precipitant and a solvent for said derivative, the first of said additions being a 30% mixture of the solvent in the precipitant, the second addition being a 20% mixture of the solvent in the precipitant and the third addition being a 10% mixture of the solvent in the precipitant, and hardening the precipitated derivative by further addition of such a mixture comprising a 10% mixture of the solvent in the precipitant.

2. Process for recovering cellulose acetate from solution in a solvent comprising acetic acid, which comprises bringing the solution gradually to the point at which the cellulose acetate is precipitated, by three successive additions of aqueous solutions of acetic acid, the first of said additions being a 30% aqueous solution of acetic acid, the second addition being a 20% aqueous solution of acetic acid and the third addition being a 10% aqueous solution of acetic acid, and hardening the precipitated cellulose acetate by a further addition of such an aqueous solution in which the concentration of said acetic acid is 10%.

HERBERT E. MARTIN.